United States Patent Office 3,819,784
Patented June 25, 1974

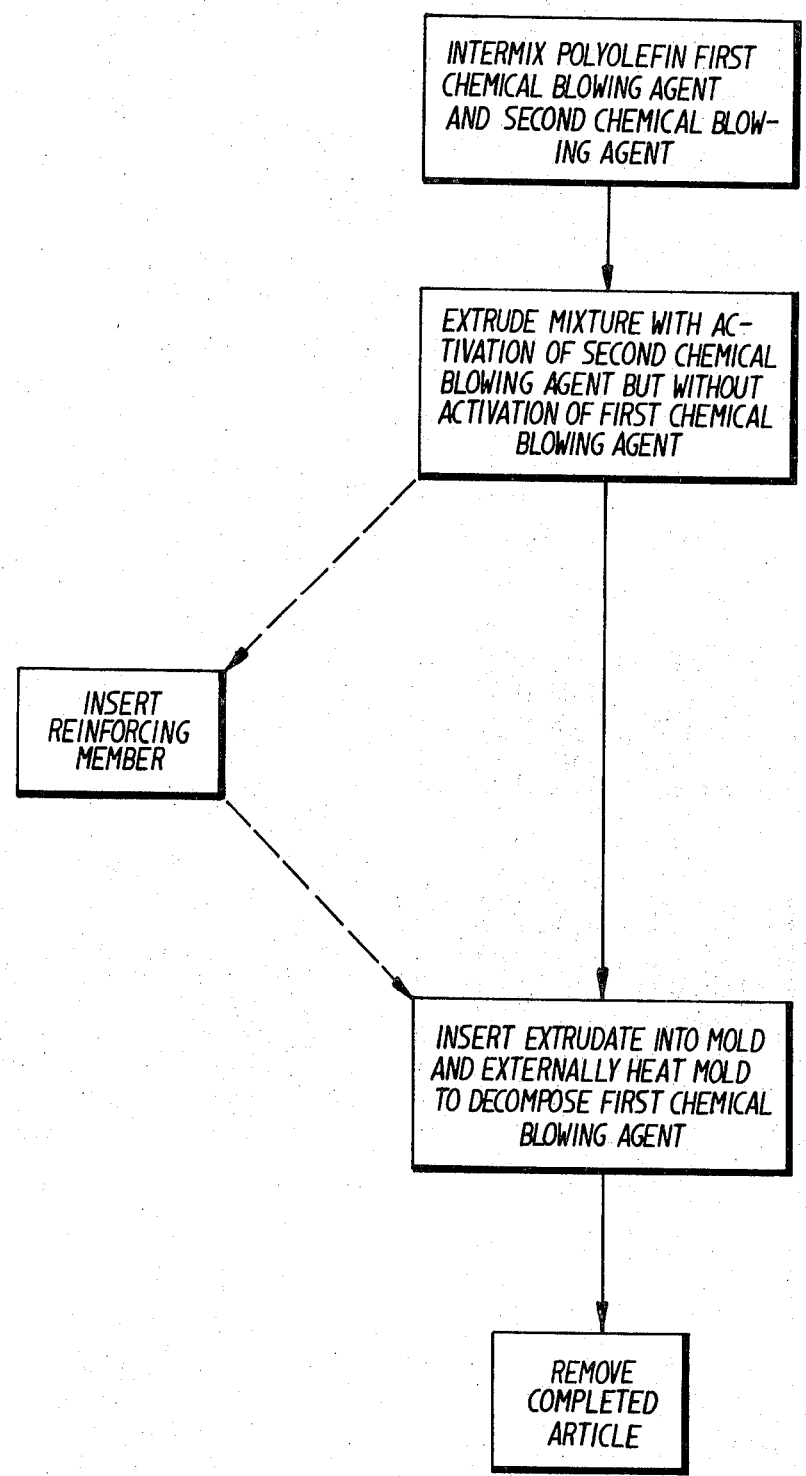

3,819,784
PROCESS FOR PREPARING MOLDED
POLYOLEFIN FOAM
Yoshifumi Hasama and Ryoichi Ito, Yokkaichi, Japan, assignors to Mitsubishi Petrochemical Co., Ltd., Chiyoda-ku, Tokyo, Japan
Filed Sept. 24, 1971, Ser. No. 183,617
Claims priority, application Japan, Oct. 7, 1970, 45/87,483
Int. Cl. B29d 27/00; B29h 7/20
U.S. Cl. 264—54                                    3 Claims

ABSTRACT OF THE DISCLOSURE

A process for preparing a molded polyolefin foam which comprises extruding a mixture of polyolefin, a first chemical blowing agent and a second blowing agent, said second blowing agent being capable of effecting foaming at a lower temperature than the decomposition temperature of the first chemical blowing agent, activating said second blowing agent so as to form preliminary foamed particles of polyolefin containing said first chemical blowing agent, and having a density of greater than 0.35 g./cc., introducing said preliminary foamed particles into a mold and externally heating said mold at a temperature higher than the decomposition temperature of said first chemical blowing agent, whereby the surface of the molded polyolefin foam is melted to provide a skin layer.

BACKGROUND OF THE INVENTION

Field of the Invention

This invention relates to a process for preparing a molded polyolefin foam. More particularly, this invention relates to a process for preparing a molded polyolefin foam, which has a surface skin layer and is characterized by high strength relative to the degree of expansion, and which can be expanded to a high degree by a heated mold method.

Description of Prior Art

It is known that high strength molded, foamed products of polyolefin can be prepared by conventional techniques, even at high degrees of expansion. Moreover, it is known that these prior art products can have a relatively tough skin layer on their outer surfaces, which is neither soft, nor tends to "powder" when stress is applied. Heretofore, however, such products could only be produced by conventional injection molding methods, which has severely limited the applicability of the material. For instance, it would be very desirable to form fork lift pallets, or skids from foamed polyolefin, but injection molding required rather expensive molds, so that such products could not practicably be obtained. Moreover, since such products as pallets and skids are intended for heavy duty use, they should be reinforced, such as with a frame of steel. But the molds used in conventional injection molding techniques cannot be easily equipped to handle such frames. Another difficulty with the prior art, was that usually the molded products were formed from an expanded foam. The degree of further expansion of such expanded foam after injection into the mold was very small due to the fact that the molding operation required pressure.

It has been contemplated to mold prefoamed polyolefin beads in a heated mold with a steel reinforcement insert in the mold. This method resulted in definite economies in that the mold and accompanying apparatus was inexpensive and the insertion of the steel reinforcement was easy. Moreover, since the degree of pressure used in the molding procedure was low, the degree of expansion could easily be increased. When heat was applied to the mold, however, it often resulted in localized areas of higher temperatures, especially when the size of the product being molded was large, which required a prolonged heating cycle. Higher temperatures cause complete melting of the polyolefin so that the beads are broken, permitting the release of the blowing agent gas without further expansion. The reason for this is that polyolefins are crystalline polymers. When the crystalline structure is melted away. there is a drastic lowering of viscosity. The structure of the partially melted beads can not withstand the pressure of the gas and the foam is broken. For this reason; it is difficult to obtain a highly expanded polyolefin foam. Moreover, the strength of the foam produced by that technique is low because it did not result in the formation of any, or at least, not a sufficient skin layer.

This deficiency was recognized, and it was contemplated to increase the strength by adding a cross-linking agent with the blowing agent to the polyolefin composition, see Japanese Patent Publication 8,840/1965. The use of a cross-linking agent did enable an increased degree of expansion, but the surface of the product remained soft, and subject to powdering, which spoiled the appearance of the product.

Another difficulty with that technique was that the use of a cross-linking agent caused the viscosity of the polyolefin beads to be increased and the fluidity to be reduced, so that it was difficult to completely and uniformly fill the mold. This was a particularly difficult problem when the mold space was narrow or when there was only a narrow space between the mold walls and the metal frame insert. This non-homogenity is responsible for the presence of voids throughout the product and for the reduced strength properties. Moreover, it often resulted in the frame being exposed through the product, which detracted from the appearance of the product. When the product is used for transporting bags and fibers, the exposed frame caused breakage of the bags, or caused the fibers to be hooked on the exposed edges.

Molded polyolefin foamed products having a strong skin layer have been formed by introducing a lower layer of low foaming beads into a mold and then introducing a middle layer of higher foaming beads on top of the first layer and finally introducing an upper layer of the lower foaming particles over that, and then foaming the mixture. This process requires a considerable degree of labor to fill the mold, so that the number of molding cycles for a massive molding operation is unacceptably low and the cost of production is unacceptably high.

SUMMARY OF THE INVENTION

Accordingly, it is one object of this invention to provide a mold heating method for preparing a high strength, highly expanded molded polyolefin foamed product.

It is another object of this invention to provided a process for preparing a large-sized molded polyolefin foam product which contains a reinforcement frame for providing added strength to the product.

It is another object of this invention to provide a process for preparing a molded polyolefin foam in a narrow grooved mold.

These and other objects have now herein been attained by admixing a polyolefin with a first chemical blowing agent and a second blowing agent, which causes blowing at a lower temperature than the temperature of the first chemical blowing agent. The mixture is then extruded from an extruder at a temperature lower than the blowing temperature of the first chemical blowing agent, to form preliminary foamed polyolefin particles containing the first chemical blowing agent, whereby the density of the particles is 0.35 g./cc. which are introduced into a mold and the mold is heated at a higher temperature than the blowing temperature of the first chemical blowing agent, so as to cause the final expansion and the formation of the molded product. The method of the present invention permits the obtaining of a highly expanded product of high strength characteristics and a surface skin layer which provides a product of good surface appearance without any significant trace of particles. This product permits the obtaining of molded foamed articles which contain a reinforcement frame, for such applications as pallets and the like.

DETAILED DESCRIPTION OF PREFERRED EMBODIMENTS

The products of this invention are formed by the use of two blowing agents and a polyolefin resin. The blowing agents should preferably have an activation temperature of at least 20° C. apart. The mixture is extruded at a temperature intermediate the activation temperature of each of the blowing agents to form preliminary foamed particles, or beads, which contain the non-activated blowing agent. The density of these particles, or beads, should be greater than 0.35 g./cc. These particles are introduced into a suitable mold and heated to the melting point of the resin, which is above the blowing temperature of the contained blowing agent. As the particles expand they are co-melted and coadhered to the shape of the mold.

This technique forms a strong skin layer surrounding the solid foam. The theory for this skin layer formation is believed to be that since heat is supplied through the mold walls, the thermal conductivity is greatest just adjacent to the walls so that the decomposition of the blowing agent is faster at the walls than at a distance from the walls. As the inner portions within the mold begin to foam, pressure is placed against the first foamed portion nearest the mold walls. Since the foam adjacent to the wall is under continuous heat, it remains unstable. When the pressure is applied by the thermal movement of the gas in the cells therefore the skin layer is formed.

As indicated above, it is desirable for the density of the preliminary foam, when the resin is a polyolefin, to be at least 0.35 g./cc. If the density is less, the cell walls become quite thin during the final foaming and are susceptible to breaking by the blowing agent gas pressure. Preferably the density should be between 0.37–0.7 when the polyolefin is low density polyethlylene, and the degree of expansion is 1.3–2.5. The density should be 0.4–0.72 when the polyolefin is high density polyethylene and the degree of expansion is 1.3–2.5. The density should be 0.35–0.65 when the polyolefin is polypropylene and the degree of expansion is 1.4–2.6.

The rate of preliminary foamed particles introduced into the mold should be preferably about 85–150% by volume of the mold.

The first chemical blowing agent which is the higher temperature activated, may be used in amounts of 0.1–3 parts/100 parts of polyolefin. Less than 0.1 parts by weight, will result in the formation of cavities, caused by the contraction of the product at the surface. It will also result in incomplete shaping and uneven surface appearance.

When the amount of first blowing agent is greater than 3 parts by weight, the foaming gas pressure will be so high that a high pressure resistant mold will be required or the foaming resin may over-flow the mold.

The mold can be heated by hot-air, high pressure steam, suitable gas-burner, infrared heater, etc.

Suitable polyolefins used in the process of this invention include low density polyethylene, high density polyethylene, isotactic polypropylene, polybutene-1, copolymers of ethylene and propylene, copolymers of ethylene and vinyl-acetate, and mixtures thereof. It is also possible to additionally use a compatible polymer, such as natural rubber, butyl rubber, ethylene-propylene rubber, polystyrene, ABS resin and polyisobutylene, or the like.

The preliminary foamed particles, containing the first chemical blowing agent, can be prepared by extruding a mixture of the polyolefin and the first and second blowing agents, by a conventional extruder, at a temperature such that only the second blowing agent causes foaming.

The blowing agents added to polyolefin for preparing the preliminary foamed particles may be a combination of two different chemical blowing agents having different decompsition temperatures, or it may be a combination of a chemical blowing agent and a mechanical blowing agent.

When chemical blowing agents are used, they should not have a decomposition temperature higher than the melting point of polyolefin. Suitable such agents include azodicarbonamide, dinitrosopentamethyltetramine, benzenesulfonylhydrazide, toluenesulfonylhydrazide, 4,4'-oxybisbenzenesulfonylhydrazide, diphenylsulfon 3,3' - disulfonylhydrazide, barium azodicarboxylate, 4,4'-oxybisbenzenesulfonylsemicarbazide, toluenesulfonylsemicarbazide, etc.

The preliminary foamed material is cut into particles having a size of 0.01–0.2 cc. before use in the final mold.

The second blowing agents having the lower decomposition temperatures, can be replaced by conventional mechanical blowing agents such as nitrogen gas, carbon dioxide, gas, Freon gas, low boiling point hydrocarbons e.g. pentane, butane, and propane.

If desired, various additives can be added for controlling the decomposition temperature of the blowing agents or for controlling the cell formation of the foam, such as zinc oxide, calcium carbonate, calcium stearate, zinc stearate, magnesium stearate, magnesium oxide, etc. It is also possible to add additives for the plastic, such as antioxidants and coloring pigments, and inorganic fillers.

Having generally described the invention, a further understanding can be obtained by reference to certain examples which are provided for purpose of illustration only and not intended to be limiting in any manner. In the examples, all parts are by weight unless otherwise noted.

Example 1

100 parts of low density polyethylene (melt index 1.0, specific gravity 0.918, manufactureed by Mitsubishi Petrochemical Co., Ltd.) was dry-blended with 1.0 part of azodicarbonamide (decomposition temperature 190° C.) and 0.5 part of toluene sulfonylhydrazide (decomposition temperature 115° C.) in a V-shape blender.

The mixture was extruded by using a conventional extruder having a diameter of 50 mm. at a temperature of 150° C. This temperature is lower than the decomposition temperature of the azodicarbonamide and higher than the blowing temperature of the toluenesulfonylhydrazide. Foamed particles containing the blowing agent, azodicarbonamide, were obtained (Sample A).

The density of foamed particles was 0.495 g./cc. and the amount of remaining azodicarbonamide was 0.89 part, which was measured by infrared spectrograph analysis.

The preliminary foamed particles were then poured into an iron mold and heated at 300° C. for 50 min. in an oven (hot air circulation system), and the molded foam product was taken up after cooling with water for 14 min.

In accordance with JISK-6911-1962, the modulus of elasticity for bending at three points, of the molded foam product was measured.

For comparison, each of the following samples were prepared:

A foamable composition (Sample B) was prepared by dry-blending 100 parts by weight of low density polyethylene powder with 1 part by weight of azodicarbonamide.

A foamable composition (Sample C) was prepared by mixing 100 parts by weight of low density polyethylene with 1 part by weight of azodicarbonamide by melting and kneading at 145° C. with an extruder having a diameter of 50 mm. without decomposition of the blowing agent.

A foamable composition (Sample D), was prepared by blending 100 parts by weight of low density polyethylene, 1 part by weight of azodicarbonamide and 0.3 part by weight of dicumylperoxide in a V-shape blender. The mix was melted and kneaded at 140° C. through an extruder having a diameter of 50 mm. without decompositions of the blowing agent.

Preliminary foamed particles (Sample E, density 0.450 g./cc.) were prepared by blending 100 parts by weight of low density polyethylene with 1 part by weight of azodicarbonamide and the mix were extruded through an extruder having a diameter of 50 mm. at a temperature of 220° C. to decompose the blowing agent.

Each sample was foamed in accordance with the above mentioned process, and the three point blending modules of elasticity of the molded foam product was measured in accordance with JISK–6911–1962.

The results are shown in Table 1.

The results of this test showed that the molded foam product of this invention had a higher bending modulus of elasticity as compared with the reference products prepared from samples B, C and D. When the expansion rates were increased, the differences of modulus of elasticity were remarkable. The facts show that this invention is effective for increasing the strength of molded foam product.

The Sample E does not contain any blowing agent, accordingly it was difficult to mold under any condition so that the modulus of elasticity could not be measured.

TABLE 1.—EXPANSION RATE BY FOAMING AND MODULUS OF ELASTICITY

| Sample | Expansion rate | Modulus of elasticity (gk./cm.$^2$) | Note |
|---|---|---|---|
| Sample A, Pre. foamed particles of this invention. | 2.5 | 370 | |
| | 3.0 | 248 | |
| | 3.5 | 167 | |
| | 4.0 | 114 | |
| Sample B | 2.5 | 245 | |
| | 3.0 | 150 | |
| | 3.5 | 92 | |
| | 4.0 | | Large voids were found. |
| Sample C | 2.5 | 220 | |
| | 3.0 | 162 | |
| | 3.5 | 99 | |
| | 4.0 | | Large voids were found. |
| Sample D | 3.0 | 155 | |
| | 3.5 | 105 | |
| | 4.0 | 75 | |
| Sample E | 2.5 | | Surface pf product was soft. No molded foam product was obtained. |
| | 3.0 | | |
| | 3.5 | | |
| | 4.0 | | |

Example 2

100 parts by weight of low density polyethylene (melt index 1.0 specific gravity 0.918 manufactured by Mitsubishi Petrochemical Co., Ltd.) was dry-blended with 1.0 part by weight of azodicarbonamide and 1.0 part by weight of toluene sulfonylhydrazide in a V-shaped blender. Various densities of preliminary foamed particles were respectively obtained in accordance with the process of Example 1. The amount of azodicarbonamide contained in the preliminary foamed particles was 0.7 part by weight. The preliminary foamed particles were filled in an iron mold, and heated at 300° C. for 50 min. in an oven (hot air circulation type).

The mold was cooled for 14 min., and a molded foamed produced was removed. The molded product was compared with the density of the preliminary formed particles and is shown in Table 2.

TABLE 2

| Density of preliminary foamed particles | Expansion rate | Molded foam product |
|---|---|---|
| 0.742 | 3.0 | Uniform cells, good appearance. |
| | 3.5 | Do. |
| | 4.0 | Coarse cells. |
| 0.503 | 3.0 | Uniform cells, good appearance. |
| | 3.5 | Do. |
| | 4.0 | Do. |
| 0.375 | 3.0 | Uniform cells, good appearance. |
| | 3.5 | Do. |
| | 4.0 | Do. |
| 0.283 | 3.0 | It is difficult to fill the mold. |
| | 3.5 | Surface is uneven. |
| | 4.0 | Cells are broken, large voids. |

According to these results, it was ascertained that in order to obtain a suitable molded foamed product, the density of preliminary foamed particles is limited.

A suitable molded foamed product can only be obtained when the density of the preliminary foamed particles are greater than 0.35 g./cc. It is difficult to obtain a suitable method foamed product if the density of the preliminary foamed particles are less than 0.283/cc. for the case of low density polyethylene.

Example 3

100 parts by weight of high density polyolefin (melt index 5.0 specific gravity 0.957 manufactured by Mitsubishi Petrochemical Co., Ltd.) was dry-blended with 1.0 parts by weight of azodicarbonamide (decomposition temperature 190° C.).

0.5 part by weight of 4,4'-oxybisbenzenesulfonylhydrazide (decomposition temperature 145–150° C.) was blended by the V-shaped blender.

The mixture was extruded by using a conventional extruder having a diameter of 50 mm. at a temperature of 165° C. which is lower than the decomposition temperature of the azodicarbonamide and higher than that of 4,4''-oxybisbenzenesulfonylhydrazide. The hydrazide thus begins decomposition to cause foaming. The preliminary foamed particles, containing the hydrazide blowing agent, was obtained. (Sample F.)

The density of the resulting preliminary foamed particles was 0.505 g./cc. and the amount of remaining azodicarbonamide was 0.75 parts/100 parts.

The resulting preliminary foamed particles were poured into an iron mold and heated at 300° C. for 50 min. in an oven (hot air circulation system), and the molded foamed product was removed after cooling with water for 14 min.

In accordance with JISK–6711–1962, the three point bending modulus of elasticity of the molded foamed product was measured.

For comparison, each of the following samples were prepared:

A foamable composition (Sample G) was prepared by dry-blending 100 parts by weight of high density polyethylene powder with 1 part by weight of azodicarbonamide.

A foamable composition (Sample H) was prepared by mixing 100 parts by weight of high density polyethylene with 1 part by weight of azodicarbonamide by melting and kneading at 170° C. with an extruder having a diameter of 50 mm. without decomposition of the blowing agent.

A foamable composition (Sample I) was prepared by blending 100 parts of weight of high density polyethylene, 1 part by weight of azodicarbonamide and 2,5-dimethyl-2,5-di(t-butylperoxy) hexsine-3, as a crosslinking agent, in a V-shape blender. The blend was melted and kneaded at 165° C. with an extruder having 50 mm. of diameter, without decomposition of the blowing agent.

Preliminary foamed particles (Sample J) of a density of 0.522 g./cc. was prepared by blending 100 parts by weight high density polyethylene with 1 part by weight of azodicarbonamide. The blend was extruded through an extruder having a diameter of 50 mm. at a temperature of 220° C. to decompose the blowing agent.

Each sample was foamed in accordance with the process of Example 1, and the three point blend modulus of elasticity of the molded foam product was measured in accordance with JISK–6911–1962.

The results are shown in Table 3.

These results indicated that molded foam product of this invention has a higher bend modulus of elasticity as compared with the reference products prepared from samples G, H and I. In other words, the results were similar to those obtained in Example 1 for low density polyethylene.

The results show that the process of this invention is effective for increasing strength when high density polyethylene is used.

TABLE 3

| Sample | Expansion rate | Modulus of elasticity (kg./cm.²) | Note |
|---|---|---|---|
| Sample E, Pre. foamed particles of this invention. | 2.5 | 1,320 | |
| | 3.0 | 1,050 | |
| | 3.5 | 820 | |
| Sample G | 2.5 | 1,350 | |
| | 3.0 | 980 | |
| | 3.5 | 750 | |
| Sample H | 2.5 | 1,200 | |
| | 3.0 | 950 | |
| | 3.5 | 710 | |
| Sample I | 2.5 | 1,250 | |
| | 3.0 | 1,015 | |
| | 3.5 | 735 | |
| Sample J | 2.5 | | No molded foam product was obtained. |
| | 3.0 | | |
| | 3.5 | | |

Example 4

An iron reinforcement pallet (980 mm. in length, 1060 mm. in width and 130 mm. in height) was constructed using a plurality of frames 25 mm. in depth of groove and 15 mm. in height and 10 mm. in width as the base, and with a plurality of side boards having numerous holes arranged in parallel.

The iron reinforcement was set in a mold on resin legs so as to hold without directly contacting the mold. In the mold, the preliminary foamed particles, (density 0.495 g./cc.), which had been prepared in accordance with Example 1 (each size of particle was 0.3–1.0 cc.), were charged with vibration into the mold using a vibrator. The mold was then closed and was heated at 300° C. for 50 minutes in a hot air circulation type furnace. The mold was cooled for 14 minutes and the molded polypropylene foam was removed from the mold. The resulting molded foam product was found to have a high strength skin layer, 100 mm. in length, 1100 mm. in width, and 150 mm. in height, and which had said iron reinforcement.

For comparison, the mixture of 100 parts by weight of low density polyethylene, 3 parts by weight of azodicarbonamide and 0.8 part by weight of dicumylperoxide, as a cross-linking agent, was uniformly kneaded at a roller temperature of 100–110° C. It was then charged into the same mold having the iron reinforcement, and the mold was heated at 150° C. for 20 minutes (temperature of furnace was 220° C.) to cross-link the polyethylene with dicumylperoxide. It was then heated to 300° C. in a furnace for 40 minutes. After cooling for 14 minutes, the molded foam was removed.

The resulting molded foam was found to have low strength characteristics and had no skin layer. It had large cavities and a rough surface. Some parts of the iron reinforcement showed through.

According to this invention, therefore, a molded polyolefin foam can be prepared having a skin layer, in which reinforcement frames may be inserted. Even with a gap, at certain parts of the reinforcement frames, of 1 mm. in width, it is possible to uniformly fill the polyolefin foam, in accordance with this invention, because of the good fluidity of the preliminary foamed particles.

Various types of reinforcement frames can be used having narrow gaps. The reinforcement material can be iron, aluminum, glass fibers or any other appropriate material. One example of a reinforcement frame is illustrated in Example 4 above.

Having fully described the invention, it will be apparent to one of ordinary skill the in the art, that many changes and modifications can be made without departing from the spirit and scope of the invention.

What is claimed and desired to be secured by Letters Patent of the United States is:

1. A process for preparing an article of molded polyolefin foam utilizing pre-expanded polyolefin containing a chemical blowing agent wherein the improvement comprises:

(a) mixing (1) a polyolefin, (2) a first chemical blowing agent present in an amount of 0.1 to 3.0 parts by weight per hundred parts by weight of polyolefin and (3) a second chemical blowing agent having a decomposition temperature greater than 20° C. below the decomposition temperature of said first chemical blowing agent and present in an amount to provide upon decomposition a degree of expansion for said polyolefin of from 1.3 to 2.6 in volume, said polyolefin having a melting point higher than the decomposition temperature of said first and second blowing agents;

(b) extruding said mixture at a temperature below the decomposition temperature of said first chemical blowing agent and above the decomposition temperature of said second chemical blowing agent to form preliminary foamed particles of polyolefin containing said first blowing agent, said foamed particles having a density greater than 0.35 g./cc. and a degree of expansion of 1.3 to 2.6 in volume;

(c) and thereafter introducing said preliminary foamed particles into a mold, the volume of preliminary foamed particles to mold volume being 85:100 to 150:100, and externally heating said mold at a temperature higher than the decomposition temperature of said first chemical blowing agent but below the decomposition temperature of said polyolefin, whereby the surface of the molded polyolefin foam is melted.

2. The process for preparing a molded polyolefin foam according to claim 2, wherein the molded polyolefin foam has a non-foamed skin layer and a low density foamed central portion.

3. The process for preparing a molded polyolefin foam according to claim 1, wherein the average size of the preliminary foamed particles is 0.01–0.2 cc.

References Cited

UNITED STATES PATENTS

| | | | |
|---|---|---|---|
| 2,898,632 | 8/1959 | Irwin et al. | 264—48 |
| 3,150,214 | 9/1964 | Scalora et al. | 264—53 |
| 3,555,130 | 1/1971 | Feuer et al. | 264—45 |
| 3,608,008 | 9/1971 | Soukup | 264—45 |
| 2,290,622 | 7/1942 | Carter | 264—54 |
| 3,082,486 | 3/1963 | Khawam | 264—45 |
| 3,225,126 | 12/1965 | Bridges et al. | 260—2.5 B |
| 3,417,038 | 12/1968 | Soltys | 260—2.5 B |
| 3,511,191 | 5/1970 | Barry et al. | 260—2.5 B |
| 3,608,031 | 9/1971 | Stastny | 264—51 |

FOREIGN PATENTS

| | | | |
|---|---|---|---|
| 408,840 | 8/1965 | Japan | 264—51 |

DONALD E. CZAJA, Primary Examiner

R. W. GRIFFIN, Assistant Examiner

U.S. Cl. X.R.

260—2.5 E, 2.5 B; 264—45, 51, 55, DIG. 5, DIG. 14